United States Patent
Tohya et al.

[19]

[11] Patent Number: 6,137,434
[45] Date of Patent: *Oct. 24, 2000

[54] MULTIBEAM RADAR SYSTEM

[75] Inventors: Ken-i-chi Tohya; Masanobu Urabe, both of Wako, Japan

[73] Assignee: Honda Giken Kogyo Kabushiki Kaisha, Tokyo, Japan

[*] Notice: This patent is subject to a terminal disclaimer.

[21] Appl. No.: 09/353,528

[22] Filed: Jul. 14, 1999

Related U.S. Application Data

[62] Division of application No. 08/847,453, Apr. 24, 1997, Pat. No. 5,933,109.

[30] Foreign Application Priority Data

May 2, 1996 [JP] Japan ................................. 8-135903
May 2, 1996 [JP] Japan ................................. 8-135904

[51] Int. Cl.⁷ ............................. G01S 7/28; G01S 13/93; H01Q 1/38
[52] U.S. Cl. .................... 342/70; 342/175; 343/700 MS
[58] Field of Search ............................. 342/70, 71, 72, 342/175; 343/700 MS

[56] References Cited

U.S. PATENT DOCUMENTS

| | | | |
|---|---|---|---|
| Re. 32,369 | 3/1987 | Stockton et al. .......................... 342/368 |
| 3,750,175 | 7/1973 | Lockerd et al. .......................... 342/371 |
| 3,833,867 | 9/1974 | Solie ........................................ 708/815 |
| 4,131,892 | 12/1978 | Munson et al. .................... 343/700 MS |
| 4,131,893 | 12/1978 | Munson et al. .................... 343/700 MS |
| 4,348,678 | 9/1982 | Thomas .................................... 343/754 |
| 4,442,590 | 4/1984 | Stockton et al. ............................ 29/571 |
| 4,641,144 | 2/1987 | Prickett .................................... 343/754 |
| 4,644,360 | 2/1987 | Mead et al. ........................ 343/700 MS |
| 4,780,723 | 10/1988 | Mead ................................ 343/700 MS |
| 4,833,482 | 5/1989 | Trinh et al. ........................ 343/700 MS |
| 4,845,507 | 7/1989 | Archer et al. ............................ 343/754 |
| 5,008,678 | 4/1991 | Herman .................................... 342/158 |
| 5,448,244 | 9/1995 | Komatsu et al. ......................... 342/155 |
| 5,486,832 | 1/1996 | Hulderman ................................ 342/70 |
| 5,508,710 | 4/1996 | Wang et al. ............................. 343/726 |
| 5,657,024 | 8/1997 | Shingyoji et al. ....................... 342/175 |
| 5,724,042 | 3/1998 | Komatsu et al. ........................ 342/175 |
| 5,933,109 | 8/1999 | Tohya et al. ............................ 342/175 |
| 5,952,973 | 9/1999 | Uematsu et al. ................. 343/700 MS |
| 6,037,911 | 3/2000 | Brankovic et al. ...................... 343/795 |
| 6,043,772 | 3/2000 | Voigtlaender et al. ................... 342/70 |

FOREIGN PATENT DOCUMENTS 0 531 877 A1   3/1993   European Pat. Off. .

OTHER PUBLICATIONS

Microstrip Patch Array with Multiple Beams, School of Electrical Engineering & Science, Royal Military College of Science, Swindon, U.K.; Authors: P.S. Hall and S.J. Vetterlein,.

*Primary Examiner*—John B. Sotomayor
*Attorney, Agent, or Firm*—Lyon & Lyon LLP

[57] ABSTRACT

A multibeam radar system includes a multibeam radar module having n (n is a natural number of at least 3) transmitting/receiving channels for transmitting high-frequency signals and receiving echo signals, and a radar circuit for detecting a distance up to an object which produces the echo signals and/or a relative speed of the object from a relationship between the high-frequency signals and the echo signals in the transmitting/receiving channels. The radar circuit includes a channel controller for selecting sets of m (m is a natural number smaller than n) adjacent transmitting/receiving channels sequentially to transmit the high-frequency signals and receive the echo signals in a high-azimuth-resolution mode. The channel controller may also select the transmitting/receiving channels sequentially one by one to transmit the high-frequency signals and receive the echo signals in a low-azimuth-resolution mode.

3 Claims, 8 Drawing Sheets

MULTIBEAM RADAR SYSTEM

This is a divisional of application Ser. No. 08/847,453 filed Apr. 24, 1997 now U.S. Pat. No. 5,933,109.

BACKGROUND OF THE INVENTION

1. Field of the Invention

The present invention relates to a multibeam radar system for use as a distance/speed detector in a collision alarm system on motor vehicles, and more particularly to a multibeam radar antenna and a multibeam radar module for radiating a plurality of radar beams in respective different directions with adjacent ones of the radar beams overlapping each other.

2. Description of the Prior Art

FM millimeter-wave radar devices for use as distance/speed detectors in collision alarm systems on motor vehicles are known from "Radar technology" published by the Society of Electronic Information Communications. The known FM millimeter-wave radar devices radiate a signal whose frequency increases or decreases in a triangular wave pattern with time forwardly of the motor vehicle and receive an echo signal reflected by another motor vehicle running ahead, The received echo signal is mixed with the transmitted signal, generating a beat signal. The distance up to the motor vehicle running ahead and the speed thereof are detected from the frequency of the beat signal.

For an FM radar system to be used as an automobile radar system, the FM radar system as installed on a motor vehicle running along a lane is required to detect a distance highly accurately within a range of 100 m and also to scan a road horizontally with high-frequency beams for monitoring motor vehicles running along left and right lanes in front of its own motor vehicle. This is because it is possible for any one of the motor vehicles running ahead along the left and right lanes to enter the lane of its own motor vehicle, and when one of the motor vehicles enters the lane, the speed of the motor vehicle equipped with the FM radar system has to be reduced to avoid collision.

Radar systems or apparatus for monitoring horizontal objects in front of a motor vehicle are disclosed in U.S. Pat. Nos. 5,008,678 and 5,496,832.

The radar system disclosed in U.S. Pat. No. 5,008,678 employs planar microstrip Butler matrixes for electronically scanning radar beams. Because of the planar microstrip Butler matrixes, however, the disclosed radar system is relatively expensive to manufacture. It is important that radar systems for use as radar sensors on motor vehicles be reduced in cost as they also find applications in radar automatic cruise control systems (ACC) and radar brake systems.

The radar apparatus revealed in U.S. Pat. No. 5,486,832 continuously radiates from a transmit antenna a broad fixed beam forwardly of the motor vehicle which carries the radar apparatus, and switches a plurality of receive antenna elements sequentially to receive a reflected beam. According the disclosure, the transmitted beam is not scanned, but the receive antenna elements are sequentially switched to receive the reflected beam for thereby monitoring an obstacle horizontally ahead of the motor vehicle. One drawback of the disclosed radar apparatus is that the transmit antenna and the receive antenna elements are located in separate positions. A dielectric lens used by the radar apparatus for converging a high-frequency beam is generally costly to manufacture. The cost of the radar apparatus will be high if independent lenses are used to transmit and receive a high-frequency beam.

Radar systems for motor vehicles are mostly mounted on front bumper, and hence should be small in size. In addition, the radar systems for motor vehicles are required to have an increased azimuth resolution. If the width of the high-frequency beam is reduced to increase the azimuth resolution, then the dielectric lens has to have an increased diameter. According to the radar apparatus disclosed in U.S. Pat. No. 5,486,932, the entire antenna assembly is large because the transmit antenna and the receive antenna elements are fully independent of each other. The higher the azimuth resolution, the greater the antenna assembly, making it more difficult to install the radar apparatus on front bumpers.

It is preferable to reduce the width of the beam radiated from the transmit antenna for the purpose of minimizing interferences between radar apparatus on motor vehicles. However, the radar apparatus disclosed in U.S. Pat. No. 5,486,832 in susceptible to such interferences because a broad fixed beam is continuously radiated from the transmit antenna.

SUMMARY OF THE INVENTION

It is an object of the present invention to provide a multibeam radar system which has an inexpensive scanning arrangement for scanning a high-frequency beam.

Another object of the present invention is to provide a multibeam radar system which has a single dielectric lens or parabolic reflecting mirror for ease of installation on motor vehicles and a low cost.

Still another object of the present invention is to provide a multibeam radar system which has an increased number of azimuth channels for an increased azimuth resolution while minimizing interferences between transmitting and receiving antenna elements.

A yet still another object of the present invention is to provide a multibeam radar system which transmits and receives FM signals in a time-sharing fashion to reduce interferences between radar systems on motor vehicles.

According to an aspect of the present invention, there is provided a multibeam radar antenna comprising a dielectric substrate and a plurality of transmitting/receiving channels for transmitting high-frequency signals and receiving echo signals, the transmitting/receiving channels being mounted on the dielectric substrate and comprising a first group of planar array antenna elements as a transmitting primary radiator and a second group of planar array antenna elements as a receiving primary radiator, the first group of planar array antenna elements and the second group of planar array antenna elements being disposed in opposite relation to each other on the dielectric substrate.

The first group of planar array antenna elements and the second group of planar array antenna elements are disposed in interdigitating relation to each other on the dielectric substrate. The multibeam radar antenna may further include a electromagnetic shield partition disposed on the dielectric substrate, the first group of planar array antenna elements and the second group of planar array antenna elements being separated from each other by the electromagnetic shield partition disposed therebetween.

According to another aspect of the present invention, there is provided a multibeam radar module comprising a dielectric substrate and a plurality of transmitting/receiving channels for transmitting high-frequency signals and receiving echo signals, the transmitting/receiving channels being mounted on the dielectric substrate and comprising a first group of planar array antenna elements as a transmitting primary radiator and a second group of planar array antenna elements as a receiving primary radiator, the first group of planar array antenna elements and the second group of planar array antenna elements being disposed in opposite relation to each other on the dielectric substrate, and a plurality of switching devices mounted on the dielectric substrate for selectively operating the transmitting/receiving channels to transmit the high-frequency signals and receive the echo signals.

The plurality of transmitting/receiving channels may comprise n (n is a natural number of at least 3) transmitting/receiving channels, and a channel controller may control the switching devices to select sets of m (m is a natural number smaller than n) adjacent transmitting/receiving channels sequentially to transmit the high-frequency signals and receive the echo signals. Alternatively, the channel controller may control the switching devices to select the transmitting/receiving channels sequentially one by one.

The high-frequency signals and the echo signals may comprise FM signals whose frequencies are variable with time, and a mixer may mix the transmitted high-frequency signals and the echo signals to generate beat signals.

According to still another aspect of the present invention, there in provided a multibeam radar system comprising a multibeam radar module having n (n is a natural number of at least 3) transmitting/receiving channels for transmitting high-frequency signals and receiving echo signals, and a radar circuit for detecting a distance up to an object which produces the echo signals and/or a relative speed of the object from a relationship between the high-frequency signals and the echo signals in-the transmitting/receiving channels, the radar circuit including a channel controller for selecting sets of m (m is a natural number smaller than n) adjacent transmitting/receiving channels sequentially to transmit the high-frequency signals and receive the echo signals.

According to yet still another aspect of the present invention, there is provided a multibeam radar system comprising a multibeam radar module having a plurality of transmitting/receiving channels for transmitting high-frequency signals and receiving echo signals, and a radar circuit for detecting a distance up to an object which produces the echo signals and/or a relative speed of the object from a relationship between the high-frequency signals and the echo signals in the transmitting/receiving channels, the radar circuit including a channel controller for selecting the transmitting/receiving channels. sequentially one by one to transmit the high-frequency signals and receive the echo signals.

According to a further aspect of the present invention, there is provided a multibeam radar system comprising a multibeam radar module having n (n is a natural number of at least 3) transmitting/receiving channels for transmitting high-frequency signals and receiving echo signals, and a radar circuit for detecting a distance up to an object which produces the echo signals and/or a relative speed of the object from a relationship between the high-frequency signals and the echo signals in the transmitting/receiving channels, the radar circuit including a channel controller for alternatively selecting sets of m (m is a natural number smaller than n) adjacent transmitting/receiving channels sequentially to transmit the high-frequency signals and receive the echo signals in a high-azimuth-resolution mode and selecting the transmitting/receiving channels sequentially one by one to transmit the high-frequency signals and receive the echo signals in a low-azimuth-resolution mode.

The channel controller may select the high-azimuth-resolution mode and the low-azimuth-resolution mode alternatively depending on a range to be detected by the radar circuit. The channel controller may select the high-azimuth-resolution mode and the low-azimuth-resolution mode alternately in predetermined periodic cycles.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
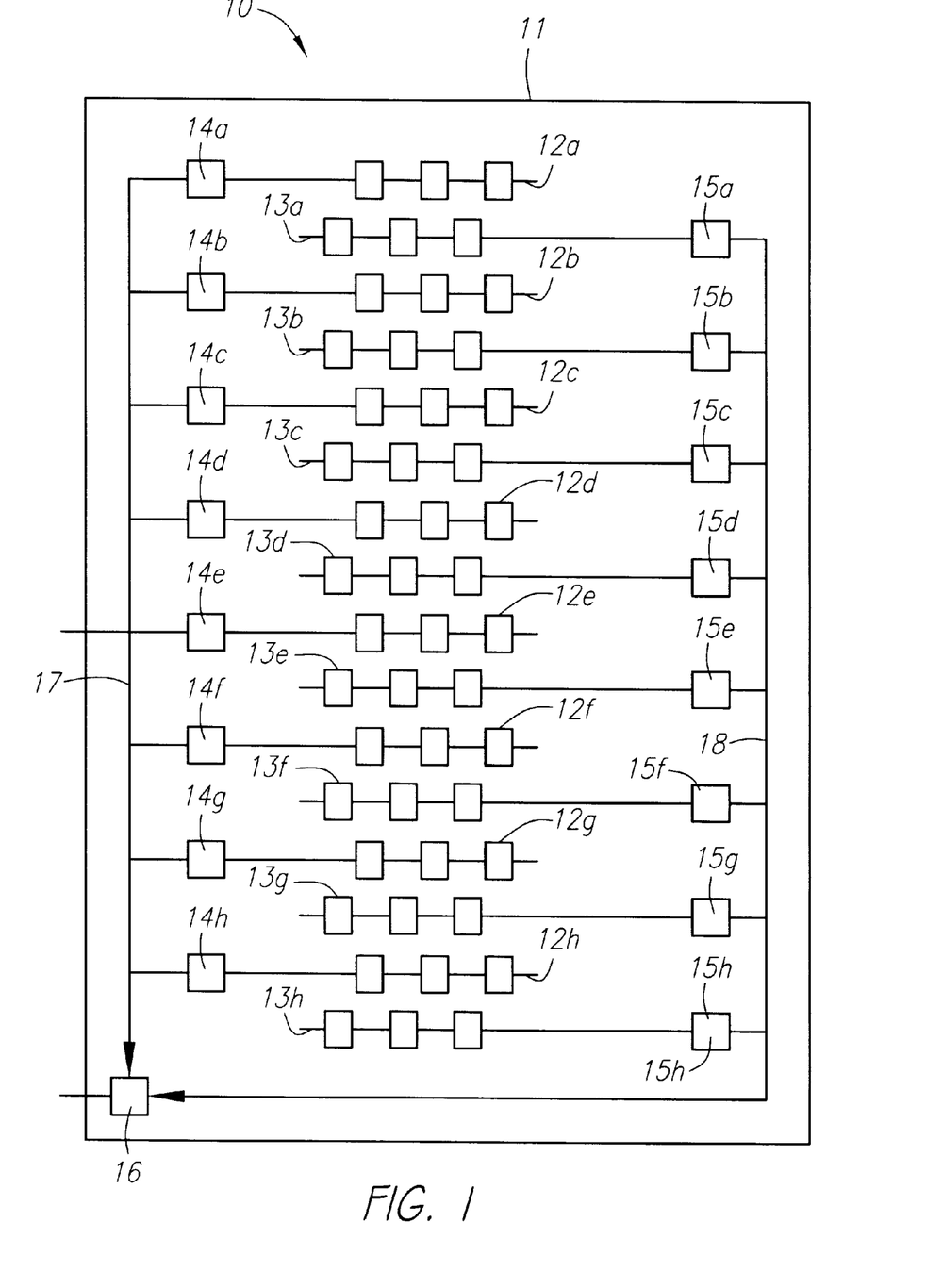
FIG. 1 is a plan view of a physical structure of a multibeam FM radar module according to an embodiment of the present invention.
Figure 2:
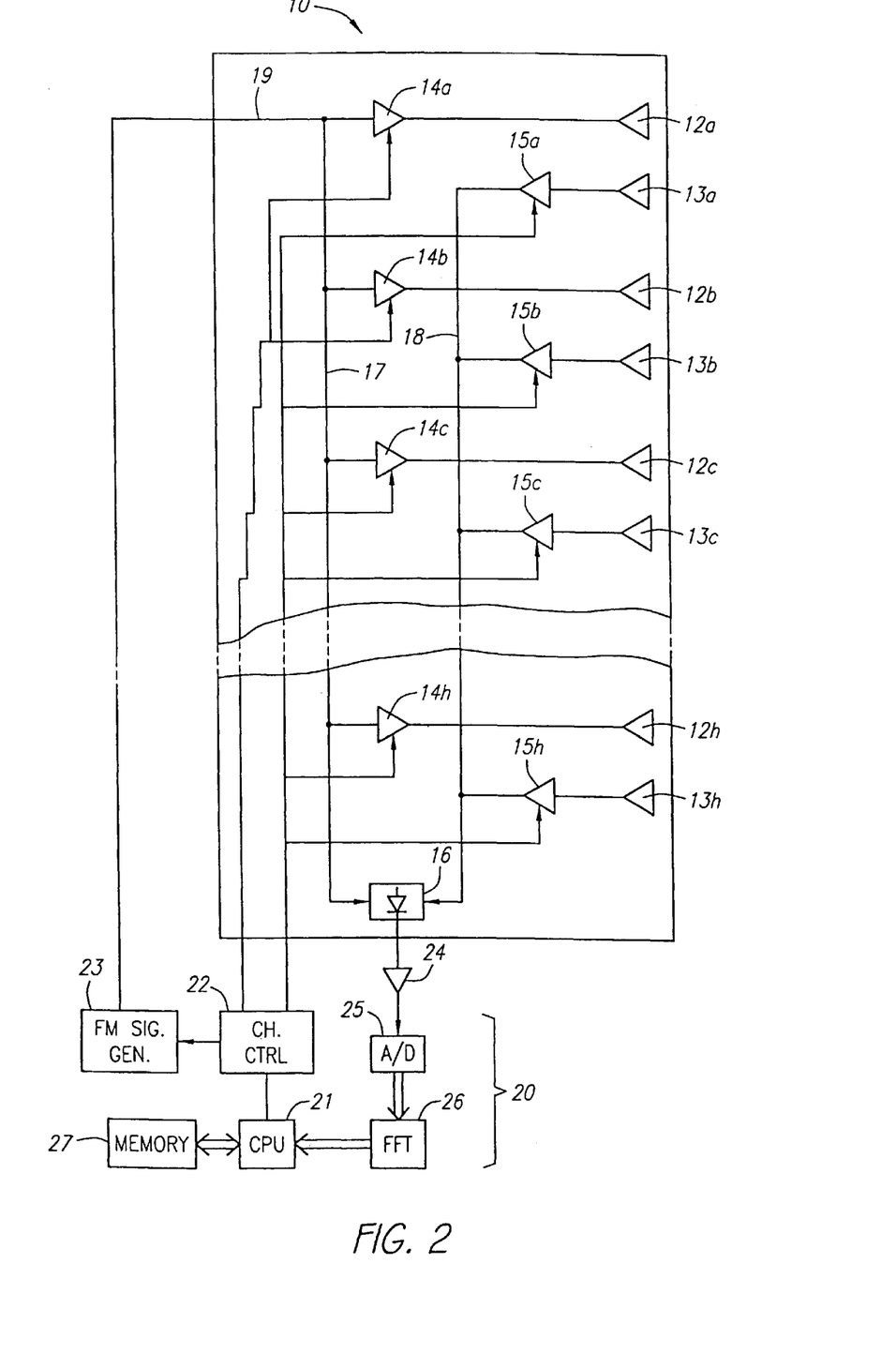
FIG. 2 is a block diagram of a multibeam FM radar system which incorporates the multibeam FM radar module shown in FIG. 1.

FIG. 1 shows a multibeam FM radar module 10 according to an embodiment of the present invention, and FIG. 2 shows a multibeam FM radar system which incorporates the multibeam FM radar module 10 shown in FIG. 1.

As shown in FIG. 1, the multibeam FM radar module 10 comprises a transmitting primary radiator which comprises a plurality of (eight) planar patch array antenna elements 12a, 12b, 12c, . . . , 12h in the form of microstrips and a receiving primary radiator which comprises a plurality of (eight) planar patch array antenna elements 13a, 13b, 13c, . . . , 13h in the form of microstrips. The patch array antenna elements 12a, 12b, 12c, . . . , 12h and the patch array antenna elements 13a, 13b, 13c, . . . , 13h jointly provide respective transmitting/receiving channels. The patch array antenna elements 12a, 12b, 12c, . . . , 12h and the patch array antenna elements 13a, 13b, 13c, . . . , 13h are mounted in opposite interdigitating relation to each other on a dielectric substrate 11. The multibeam FM radar module also comprises a plurality of switching devices 14a, 14b, 14c, . . . , 14h mounted on the dielectric substrate 11 and electrically connected respectively to the patch array antenna elements 12a, 12b, 12c, . . . , 12h, and a plurality of switching devices 15a, 15b, 15c, . . . , 15h mounted on the dielectric substrate 11 and electrically connected respectively to the patch array antenna elements 13a, 13b, 13c, . . . , 13h. Each of the switching devices 14a, 14b, 14c, . . . , 14h and the switching devices 15a, 15b, 15c, . . . , 15h comprises an MMIC (Monolithic Microwave Integrated Circuit) which includes high electron mobility transistors (HEMT). However, each of the switching devices 14a, 14b, 14c, . . . , 14h and the switching devices 15a, 15b, 15c, . . . , 15h may comprise pin diodes instead of an MMIC of HEMTs.

As shown in FIG. 2, the patch array antenna elements 12a, 12b, 12c, . . . , 12h are electrically connected through the respective switching devices 14a, 14b, 14c, . . . , 14h and a common feed line 19 to an FM signal generator 23 of a main radar circuit 20. The patch array antenna elements 13a, 13b, 13c, . . . , 13h are electrically connected through the respective switching devices 15a, 15b, 15c, . . . , 15h and a common feed line to an input terminal of a mixer 16 which is mounted on the dielectric substrate 11. Another input terminal of the mixer 16 is connected to the FM signal generator 23 through the feed line 19. The mixer 16 may be not only single mixer but also a plurality of mixers correspond to the each switching device 15a, 15b, 15c, . . . , 15h and the each patch array antenna elements 13a, 13b, 13c, . . . , 13h.

Figure 3:
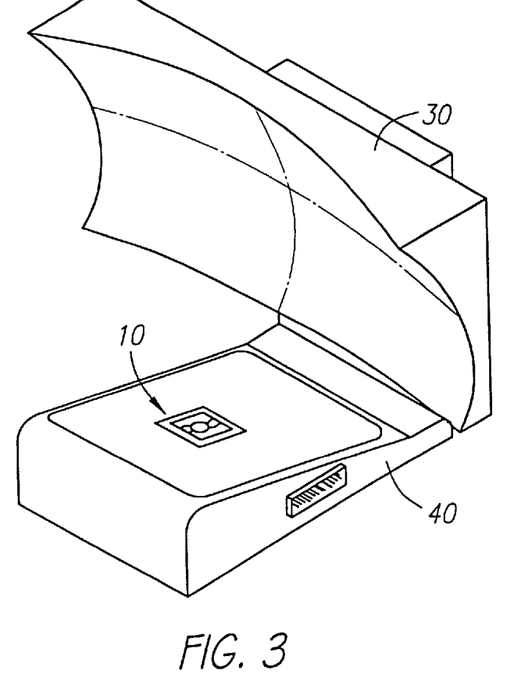
FIG. 3 is a perspective view of a substantially parabolic reflecting mirror combined with the multibeam FM radar module shown in FIG. 1.

The transmitting and receiving primary radiators are used an a primary radiator of an offset defocused multiple-beam parabolic antenna shown in FIG. 3. As shown in FIG. 3, the multibeam FM radar module 10 is mounted on a holder 40 and positioned in the vicinity of the focal point of a substantially parabolic reflecting surface 30, serving as a secondary radiator, which is coupled to the holder 40 and faces the holder 40.

The transmitting and receiving primary radiators and the substantially parabolic reflecting surface 30 as the secondary radiator jointly make up the offset defocused multiple-beam parabolic antenna. The offset defocused multiple-beam parabolic antenna is typically mounted on the front bumper of a motor vehicle.

The substantially porabolic reflecting surface 30 may be replaced with another reflecting surface such as a cylindrical reflecting surface, a hyperbolic reflecting surface, a horn-shaped reflector, or a corner reflector.

Figure 4:
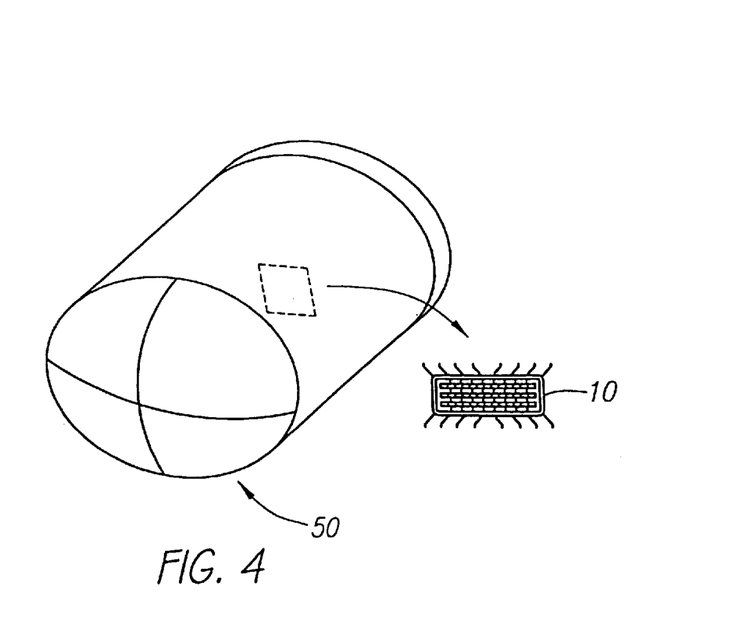
FIG. 4 is a perspective view of a dielectric lens combined with the multibeam FM radar module shown in FIG. 1.

The multibeam FM radar module shown in FIG. 1 may instead be combined with a dielectric lens 50 as shown in FIG. 4, In FIG. 4, the multibeam FM radar module is positioned in the vicinity of the focal point of the dielectric lens 50.

As shown in FIG. 2, an FM signal generated by the FM signal generator 23 is supplied through the switching devices 14a, 14b, 14c, . . . , 14h to the patch array antenna elements 12a, 12b, 12c, . . . , 12h, which radiate FM signal beams. The FM signal from the FM signal generator 23 is also supplied to the mixer 16. The radiated FM signal beams are reflected by the reflecting surface 30, and radiated in slightly different directions, respectively, from the reflecting surface 30 with adjacent ones of the radiated FM signal beams overlapping each other. When the radiated FM signal beams are reflected an echo FM signal beams by an object such as another motor vehicle, the echo FM signal beams travel back to the reflecting surface 30 and reflected thereby to the patch array antenna elements 13a, 13b, 13c, . . . , 13h. The received echo FM signals are selected by the switching devices 15a, 15b, 15c, . . . , 15h and supplied to the mixer 16.

The mixer 16 generates a beat signal by mixing the FM signal from the FM signal generator 23 and the echo FM signals from the switching devices 15a, 15b, 15c, . . . , 15h. The beat signal is supplied to the main radar circuit 20. In the main radar circuit 20, the beat signal is supplied through a switching device 24 to an A/D (analog-to-digital) converter 25, which converts the analog beat signal to a digital signal. The digital signal is supplied to a fast-Fourier transform (FFT) circuit 26, The fast-Fourier transform circuit 26 effects a fast-Fourier transform on the digital beat signal to generate a frequency spectrum signal of the beam signal, and sends the frequency spectrum signal to a CPU (central processing unit) 21. The CPU 21 detects a beat frequency from the frequency spectrum signal, and determines the distance up to the object which has reflected the FM signal beams and a rate of change of the distance with respect to time based on the detected beat frequency. The CPU 21 stores data about the determined distance and rate of change thereof in a memory 27.

At the same time, the CPU 21 controls a channel controller 22 to select the transmitting/receiving channels successively for transmitting FM signal beams and receiving echo FM signal beams. Specifically, the channel controller 22 sends control signals to the switching devices 14a, 14b, 14c, . . . , 14h and the switching devices 15a, 15b, 15c, . . . , 15h for selecting the transmitting/receiving channels sequentially in sets of adjacent channels or one by one.

Figure 5:
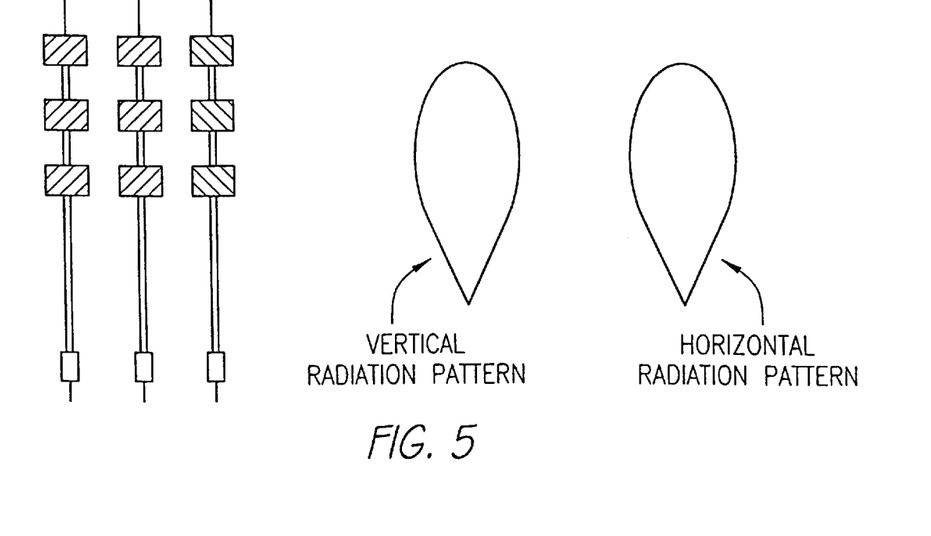
FIG. 5 is a diagram showing vertical and horizontal radiation patterns of a three-element patch array antenna.

For example, if three adjacent transmitting/receiving channels are simultaneously selected, vertical and horizontal radiation patterns of three patch array antenna elements, i.e., a three-element patch array antenna, are similarly sharp as shown in FIG. 5.

Figure 6:
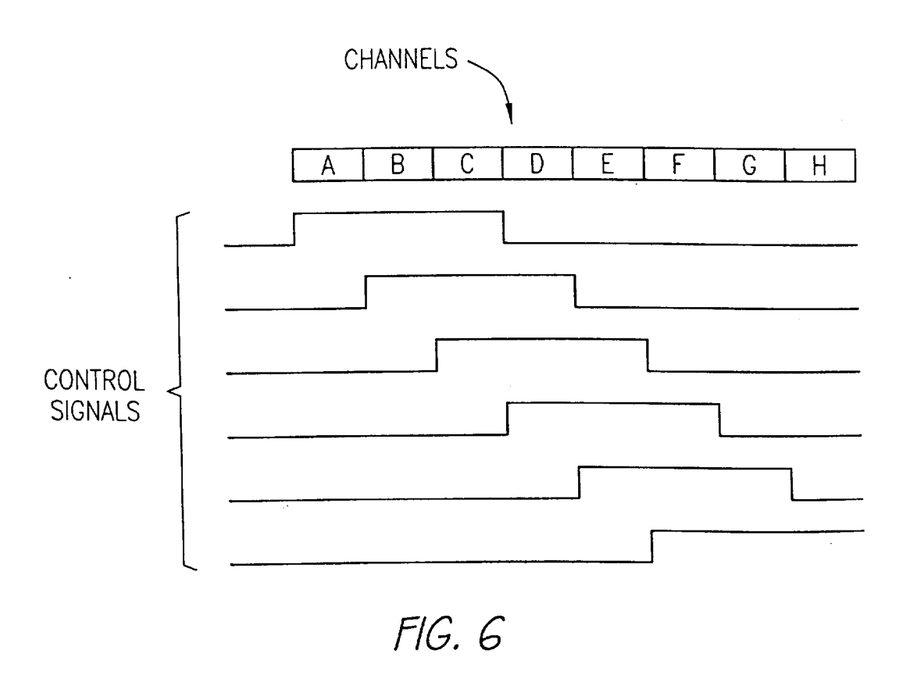
FIG. 6 is a timing chart illustrative of the manner in which sets of three adjacent transmitting/receiving channels are operated sequentially.

In such a three-element selection mode, control signals supplied from the channel controller 22 to the switching devices 14a~14h, 15a~15h are turned on and off an shown in FIG. 6. In FIG. 6, the control signals as they are turned on represent activation of the channels A~H, and the control signals as they are turned off represent inactivation of the channels A~B. When the control signals are turned on as shown in FIG. 6, sets of three channels A, B, C, three channels B, C, D, three channels C, D, E, and so on are selected sequentially to transmit and receive FM signal beams. In this three-element selection mode, the horizontal radiation pattern is also sharp for detecting an object in a far range with a high azimuth resolution.

Figure 7:
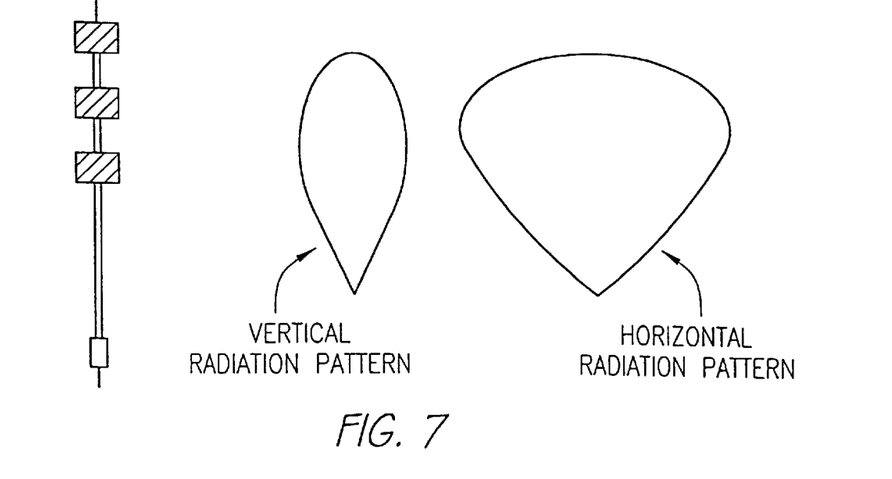
FIG. 7 is a diagram showing vertical and horizontal radiation patterns of a one-element patch array antenna.

If one of the transmitting/receiving channels is selected at a time, then a horizontal radiation pattern of one patch array antenna element, i.e., a one-element patch array antenna, is wider than its vertical radiation pattern as shown in FIG. 7.

Figure 8:
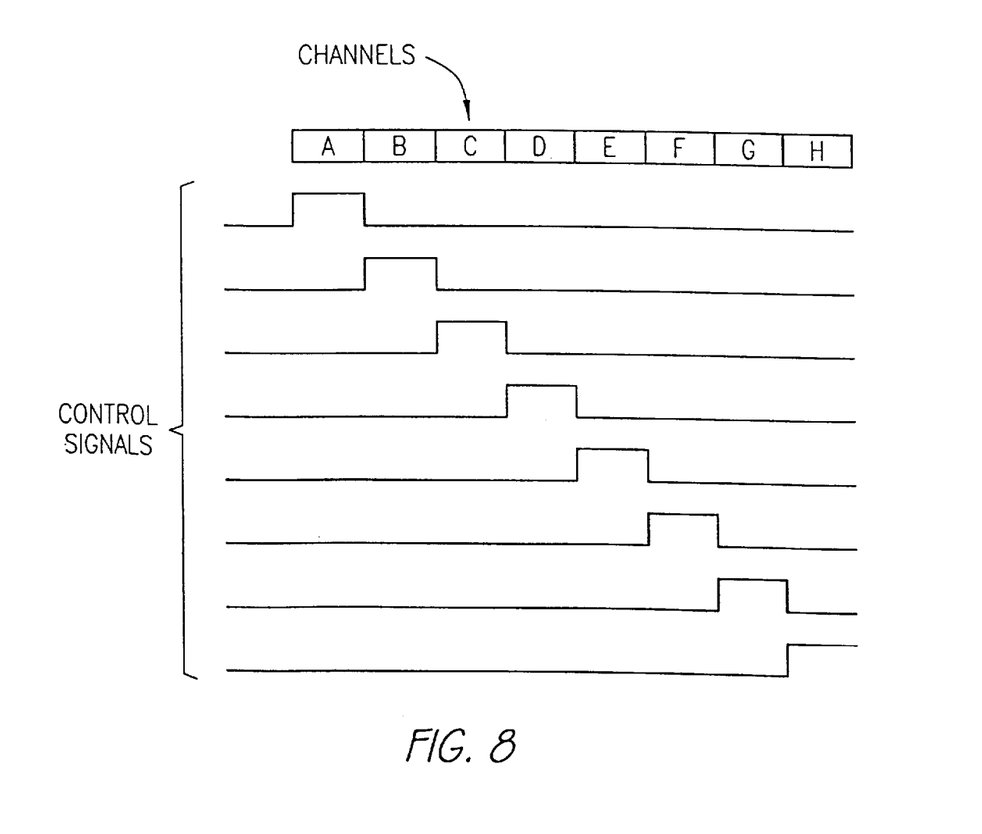
FIG. 8 is a timing chart illustrative of the manner in which transmitting/receiving channels are operated sequentially one by one.

In such a one-element selection mode, control signals supplied from the channel controller 22 to the switching devices 14a~14h, 15a~15h are turned on and off as shown in FIG. 8. In FIG. 8, the control signals as they are turned on represent activation of the channels A~H, and the control signals as they are turned off represent inactivation of the channels A~H. When the control signals are turned on as shown in FIG. 8, the channels A–B are selected sequentially one by one to transmit and receive FM signal beams. In this one-element selection mode, the horizontal radiation pattern is wider than the vertical radiation pattern for detecting an object in a short wide range near the motor vehicle.

Figure 9:
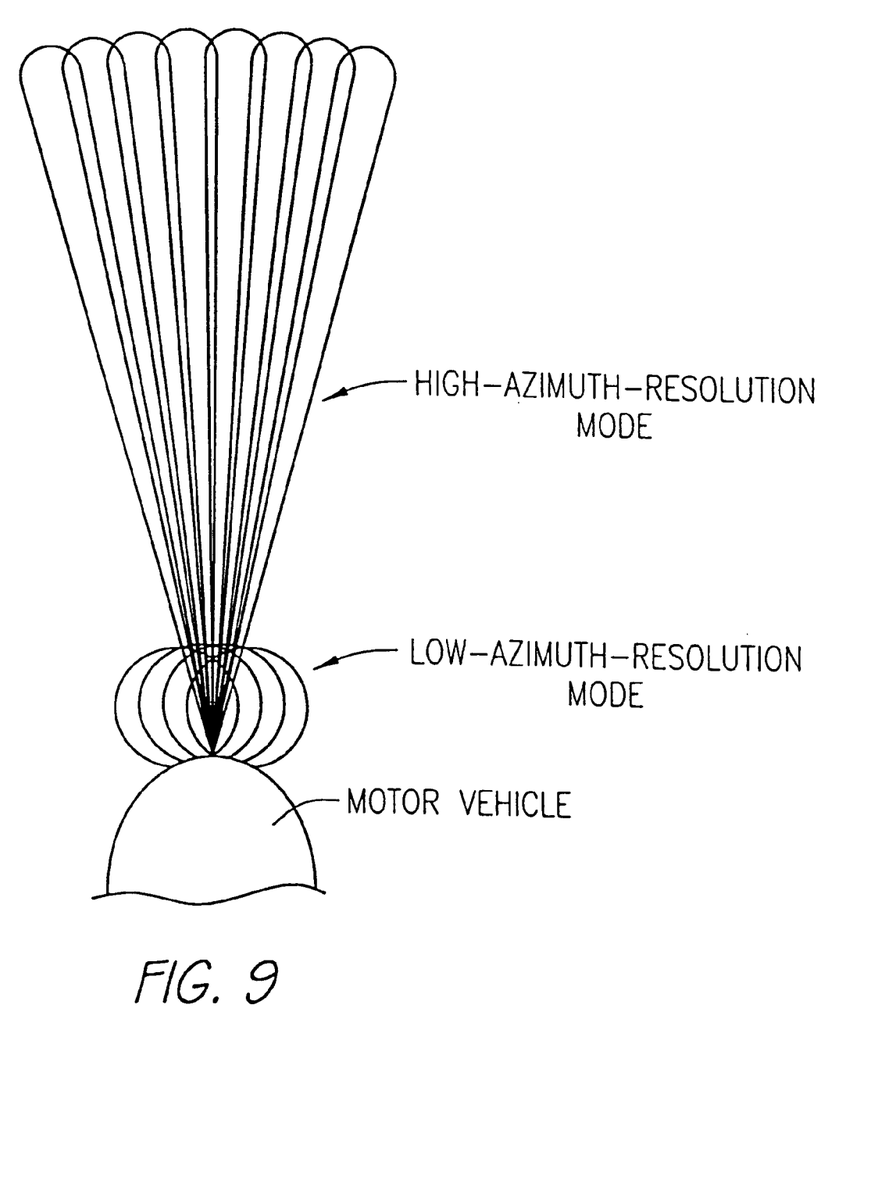
FIG. 9 is a diagram illustrative of a horizontal radiation pattern in a high-azimuth-resolution mode and a horizontal radiation pattern in a low-azimuth-resolution mode.

FIG. 9 shows a horizontal radiation pattern in a high-azimuth-resolution mode, which may be the three-element selection mode, and a horizontal radiation pattern in a low-azimuth-resolution mode, which may be the one-element selection mode. In the high-azimuth-resolution mode, sharp FM signal beams are radiated from the multibeam radar antenna to a far area in front of the motor vehicle. In the low-azimuth-resolution mode, short wide FM signal beams are radiated from the multibeam radar antenna to a near wide area in front of the motor vehicle.

According to a modification, the CPU 21 may control the channel controller 22 to select the transmitting/receiving channels in a manner to operate alternately in the high-azimuth-resolution mode and the low-azimuth-resolution mode in predetermined periodic cycles for thereby monitoring the far area and the near wide area alternately. Alternatively, the CPU 21 may control the channel controller 22 to select sets of two adjacent channels, i.e., two channels A, B, two channels B, C, two channels C, D, and so on (see FIG. 6) sequentially to transmit and receive FM signal beams for thereby achieving a resolution intermediate between the resolutions of the modes shown in FIGS. 6 and 8, respectively. Further alternatively, the CPU 21 may control the channel controller 22 to select sets of four adjacent channels, i.e., four channels A, B, C, D, four channels B, C, D, E, four channels C, D, E, F, and so on (see FIG. 6) sequentially to transmit and receive FM signal beams for thereby achieving a resolution higher than the resolution of the mode shown in FIG. 6.

Figure 10:
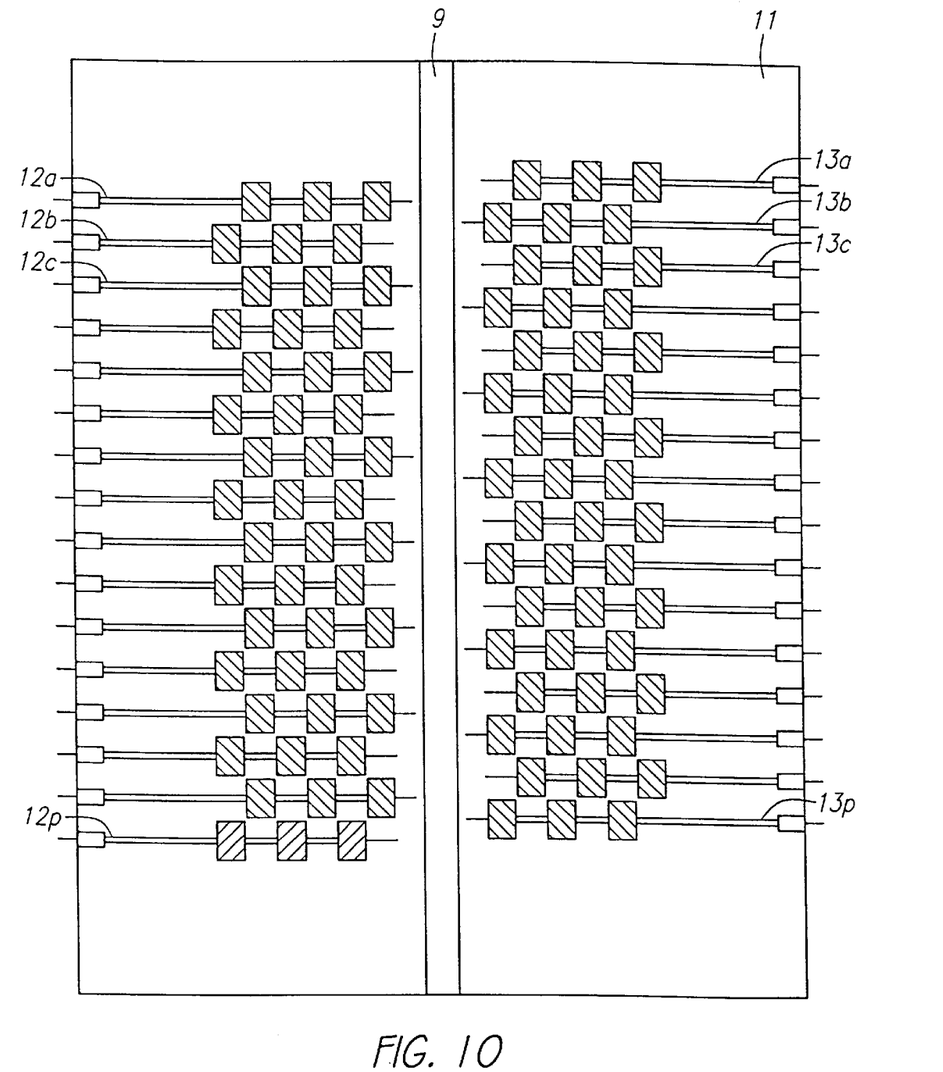
FIG. 10 is a plan view of a physical structure of a multibeam FM radar antenna according to another embodiment of the present invention.
Figure 11:
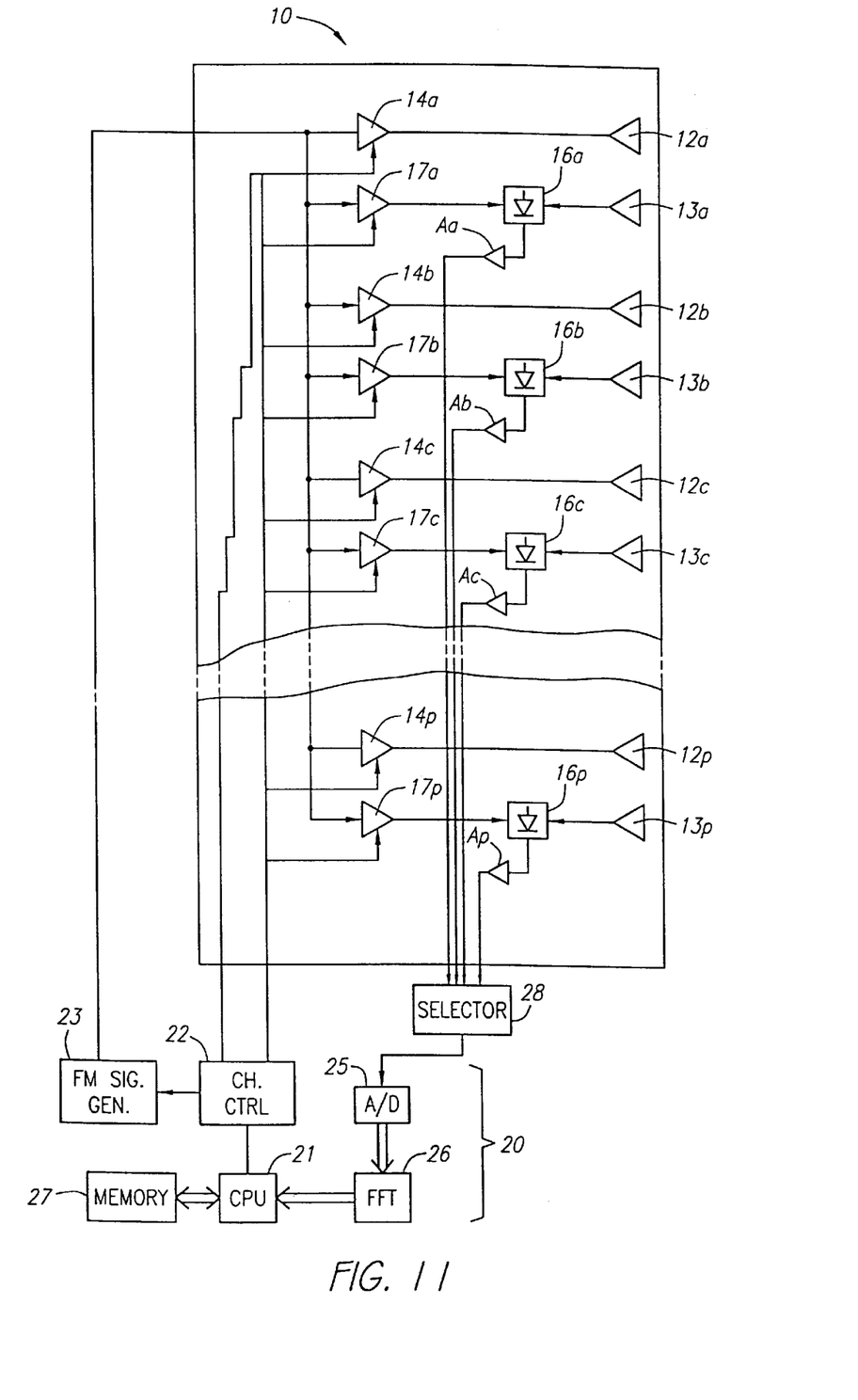
FIG. 11 is a block diagram of a multibeam FM radar system which incorporates the multibeam FM radar antenna shown in FIG. 10.

FIG. 10 shows a physical structure of a multibeam FM radar antenna according to another embodiment of the present invention, and FIG. 11 shows a multibeam FM radar system which incorporates the multibeam FM radar antenna shown in FIG. 10.

In FIG. 10, the multibeam FM radar antenna comprises a plurality of (sixteen) patch array antenna elements 12a, 12b, 12c, . . . , 12p in the form of microstrips and a receiving primary radiator which comprises a plurality of (sixteen) patch array antenna elements 13a, 13b, 13c, . . . , 13p in the form of microstrips. The patch array antenna elements 12a–12p and the patch array antenna elements 13a–13h are mounted in opposite relation to each other on a dielectric substrate 11, and separated from each other by a electromagnetic shield partition 9 disposed therebetween centrally on the dielectric substrate 11.

In FIG. 11, those parts which are identical to those shown in FIG. 2 are designated by identical reference numerals and representations, and will not be described in detail below. The multibeam FM radar antenna includes a plurality of mixers 16a~16p associated respectively with the sixteen transmitting/receiving channels, and a plurality of local-oscillation switching devices 17a~17p for selectively supplying local oscillation signals to the mixers 16a~16p, respectively. Beat signals generated by the respective mixers 16a~16p are amplified by respective intermediate-frequency amplifiers Aa~Ap and then supplied to a selector 28 of the main radar circuit 20.

The multibeam FM radar system shown in FIG. 11 operates essentially in the same manner as the multibeam FM radar system shown in FIG. 2.

The principles of the present invention are also applicable to multibeam radar modules or systems of other types including a multibeam AM radar module or multibeam pulse doppler radar system.

With the arrangement of the present invention, as described above, since the transmitting primary radiator comprising patch array antenna elements and the receiving primary radiator comprising patch array antenna elements are separate from each other, no circulators are required by the multibeam radar module and the multibeam radar antenna. Therefore, the multibeam radar module and the multibeam radar antenna may be relatively small in size.

The patch array antenna elements of the transmitting primary radiator and the patch array antenna elements of receiving primary radiator are mounted in opposite relation on the single dielectric substrate. Therefore, any interferences between adjacent ones of the transmitting/receiving channels are minimized for increased detection accuracy. The antenna of the present invention may be used in indoor communication system.

The transmitting/receiving channels are selected sequentially in sets of adjacent channels or one by one. Consequently, the multibeam radar module and the multibeam radar antenna provides high azimuth detection accuracy.

Although certain preferred embodiments of the present invention have been shown and described in detail, it should be understood that various changes and modifications may be made therein without departing from the scope of the appended claims.

What is claimed is:

1. A multibeam antenna comprising:

a dielectric substrate; and a plurality of transmitting/receiving channels for transmitting high-frequency signals and receiving echo signals, said transmitting/receiving channels being mounted on said dielectric substrate and comprising a first group of planar array antenna elements acting as a transmitting only primary radiator and a second group of planar array antenna elements acting as a receiving only primary radiator, said first group of planar array antenna elements and said second group of planar array antenna elements being disposed in opposite relation to each other on said dielectric substrate to reduce interference between the first and second groups of antenna elements.

2. A multibeam antenna according to claim 1, wherein said first group of planar array antenna elements and said second group of planar array antenna elements are disposed in interdigitating relation to each other on said dielectric substrate.

3. A multibeam antenna according to claim 1, further comprising an electromagnetic shield partition disposed on said dielectric substrate, said first group of planar array antenna elements and said second group of planar array antenna elements being separated from each other by said electromagnetic shield partition disposed therebetween.

* * * * *